US011668355B2

(12) United States Patent
Steiner

(10) Patent No.: US 11,668,355 B2
(45) Date of Patent: Jun. 6, 2023

(54) CLUTCH ACTUATION UNIT

(71) Applicant: ZF Friedrichshafen AG, Friedrichshafen (DE)

(72) Inventor: Robert Steiner, Fronhofen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 43 days.

(21) Appl. No.: 17/606,828

(22) PCT Filed: Mar. 4, 2020

(86) PCT No.: PCT/EP2020/055714
§ 371 (c)(1),
(2) Date: Oct. 27, 2021

(87) PCT Pub. No.: WO2020/221493
PCT Pub. Date: Nov. 5, 2020

(65) Prior Publication Data
US 2022/0228629 A1    Jul. 21, 2022

(30) Foreign Application Priority Data
Apr. 30, 2019  (DE) .......................... 102019206232.6

(51) Int. Cl.
*F16D 27/00*  (2006.01)
*F16D 23/12*  (2006.01)

(52) U.S. Cl.
CPC ........... *F16D 27/004* (2013.01); *F16D 23/12* (2013.01); *F16D 2023/123* (2013.01)

(58) Field of Classification Search
CPC .. F16D 2023/123; F16D 27/004; H02N 13/00
See application file for complete search history.

(56) References Cited

U.S. PATENT DOCUMENTS

2006/0199697 A1* 9/2006 Kirkwood ............. F16D 48/064
477/5
2006/0254845 A1* 11/2006 Baasch ................. B60K 17/02
180/233
(Continued)

FOREIGN PATENT DOCUMENTS

DE    102005054912 A1   5/2007
DE    102012111939 A1   6/2013
(Continued)

OTHER PUBLICATIONS

International Search Report and Written Opinion for PCT/EP2020/055714 dated Apr. 14, 2020 (12 pages; with English translation).

*Primary Examiner* — Stacey A Fluhart
(74) *Attorney, Agent, or Firm* — Kristin L. Murphy

(57) ABSTRACT

The disclosure relates to a disengagement system for actuating a clutch, in particular a clutch in the powertrain of a motor vehicle between the drive motor and the transmission, having a threaded spindle which is rotationally fixed to the clutch at an end region and is thus connected to the drive motor. The disengagement system additionally comprises a disengagement unit, having a stator and a rotor which is connected to the stator by an axial bearing, wherein the rotor rotates together with the threaded spindle and is in engagement with the threaded spindle via a spindle nut, and the clutch is actuated by adapting the rotational speed of the rotor.

14 Claims, 2 Drawing Sheets

(56) References Cited

U.S. PATENT DOCUMENTS

| | | | | |
|---|---|---|---|---|
| 2007/0060434 A1* | 3/2007 | Baasch | ............... | F16D 27/12 |
| | | | | 475/18 |
| 2014/0345985 A1* | 11/2014 | Miller | ............... | F16D 27/004 |
| | | | | 188/79.55 |
| 2016/0348775 A1 | 12/2016 | Schumann et al. | | |

FOREIGN PATENT DOCUMENTS

| | | |
|---|---|---|
| DE | 102018105583 B3 | 3/2019 |
| EP | 2873891 A1 | 5/2015 |
| JP | S6018624 A | 1/1985 |

\* cited by examiner

CLUTCH ACTUATION UNIT

CROSS-REFERENCE TO RELATED APPLICATIONS

This application is a national stage of International Application No. PCT/EP2020/055714, filed Mar. 4, 2020, the disclosure of which is incorporated herein by reference in its entirety, and which claimed priority to German Patent Application No. 102019206232.6, filed Apr. 30, 2019, the disclosure of which is incorporated herein by reference in its entirety.

TECHNICAL FIELD

The present disclosure relates to a clutch actuation unit.

BACKGROUND

Friction clutches are known in very different forms. They comprise substantially of friction linings, fastened to a clutch disk, which are arranged axially between a pressure plate and a flywheel on the drive side. The clutch disk is fixedly connected to a driven shaft, for example an input shaft of a transmission. The flywheel is fixedly coupled with a drive shaft of a motor. The clutch can be transferred via a clutch actuation unit into a so-called engaged or released state by actuation of the pressure plate in the axial direction by one or more spring elements. In the engaged state, a torque is transmitted from the drive shaft to a driven shaft of the transmission. There is used for this purpose a so-called release bearing, which can be adjusted in the axial direction, for example by a spring force. This release bearing acts indirectly or directly on the clutch disk, so that frictional engagement occurs between the clutch disk and the adjacent friction partners. The release bearing thus effects the connection or separation of the clutch from the transmission and the motor.

For example, in pneumatically actuated central release devices, wear compensation, which occurs owing to frequent use of the clutch and the associated wear of the friction linings, takes place in that the actuating piston changes its working range. However, especially in the new state of the clutch, a relatively large dead volume is required in the piston chamber. Furthermore, in the absence of a grease film or lubricating film, so-called stick-slip behavior can occur. As a result of these effects, control is slowed down and the clutch actuation unit in some cases becomes poorly controllable. Controllability is poor especially at the inversion point of the spring characteristic.

SUMMARY

Accordingly, it is an object of this invention to provide what is needed is an improved clutch actuation unit for friction clutches. This object is achieved according to the invention by the features of the independent patent claims. Advantageous embodiments are the subject-matter of the dependent claims.

There is proposed herein a release system for actuating a clutch, in particular a clutch in the drive train of a motor vehicle between the drive motor and the shift transmission, having a threaded spindle which is connected at an end region in a rotationally fixed manner to the clutch and thus to a drive motor. The release system further has a release unit having a stator and a rotor, which is connected to the stator by axial bearings, wherein the rotor rotates with the threaded spindle and is in engagement therewith via a spindle nut, and wherein actuation of the clutch takes place by adaptation of the rotational speed of the rotor.

In one exemplary arrangement, actuation of the clutch is opening of the clutch and takes place by regenerative braking of the rotor. This is made possible by the purposive use of the energy supplied by the combustion engine. Advantageously, closing of the clutch takes place by additional energization of the stator. By additional energization of the stator, the clutch can be closed more quickly. In one exemplary arrangement, the rotor is in the form of an electromagnet with slip ring connection or in the form of a permanent magnet. The arrangement as an electromagnet is the simplest exemplary arrangement, but other arrangements are also possible.

In one exemplary arrangement, actuation of the clutch is opening of the clutch and takes place by an eddy-current brake, in which at least one metal disk serving as the rotor is connected to the stator by a spindle nut via axial bearings. Advantageously, two, three or more metal disks arranged parallel to one another at a predetermined distance from one another are provided. The brake force can thus be adapted.

By providing the release unit according to the disclosure, closing and opening of the clutch is quicker and better controllable, since no dead volume is present.

In one exemplary arrangement, the pitch of the threaded spindle is chosen such that resetting of the clutch takes place automatically. The pitch is dependent on the use, that is to say, for example, use in a passenger car or truck, and is to be chosen by the person skilled in the art according to the transmission used and the transmission ratio thereof etc. Resetting is also dependent on the springs used in the clutch.

In one exemplary arrangement, the energy generated by actuation of the clutch is supplied to a unit present in the motor vehicle for further use. The energy that is generated is accordingly used further and is not released into the surroundings unused.

There is further proposed a motor vehicle having a transmission, a drive motor, and a described release system.

There is further proposed a method for controlling a described release system, wherein a threaded spindle, which is connected at an end region in a rotationally fixed manner to the clutch and thus to the drive motor, is operatively connected to a release unit, having a stator and a rotor, which is connected to the threaded spindle via a spindle nut and is connected to the stator by axial bearings, in such a manner that actuation of the clutch takes place by adaptation of the rotational speed of the rotor. In one exemplary arrangement, control takes place by a control device, in one exemplary arrangement a transmission control device, which communicates with the release system. To this end, the method is in the form of a computer program product which is correspondingly implemented in the control device.

Further features and advantages of the disclosure will become apparent from the following description of exemplary arrangements of the, with reference to the figures of the drawing, which shows details according to the disclosure, and from the claims. The individual features can be implemented in a variant of the disclosure each individually or several together in any desired combination.

BRIEF DESCRIPTION OF DRAWINGS

Preferred exemplary arrangements of the disclosure will be explained in greater detail hereinbelow with reference to the accompanying drawing.

DETAILED DESCRIPTION

Figure 1:
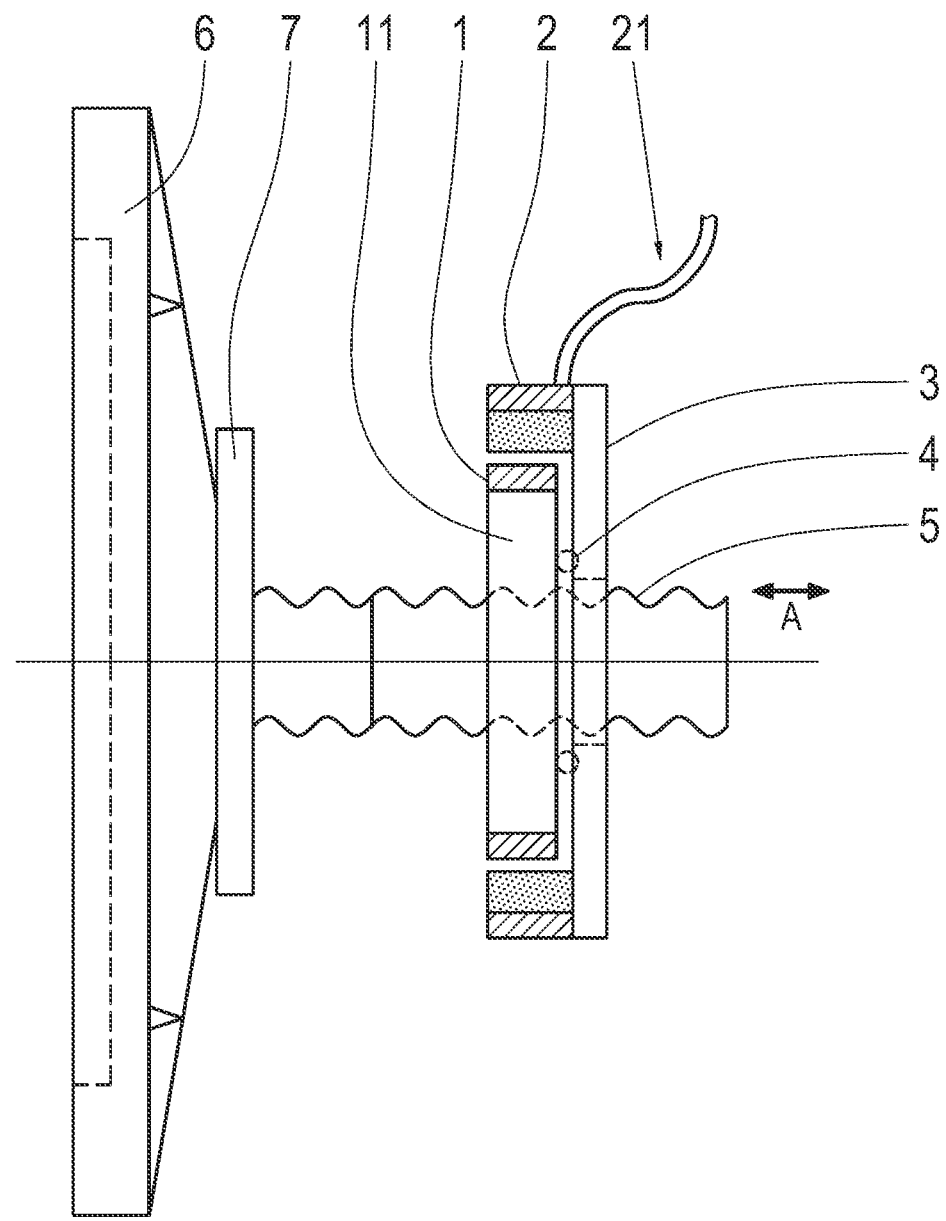
FIG. 1 shows a release system according to an exemplary arrangement of the present disclosure.

In the following descriptions of the figures, identical elements and functions are provided with identical reference numerals.

Hitherto, clutches have been operated predominantly pneumatically. This leads to the problem, especially in the case of friction couplings, that a large dead volume is present, and stick-slip effects can occur. Control is thus slowed down and the clutch actuation unit is in some cases poorly controllable. Moreover, consideration is being given to implementing automated switching at the transmission electromotively, wherein electrical control of clutch actuation was considered. Since the currents required for clutch actuation are very great in the case of conventional electrical controls, it has hitherto not been possible to electrify clutch control.

The present disclosure has a solution by which improved clutch actuation is provided. In order to actuate the clutch 6, there is used according to the disclosure instead of pneumatic actuation a release unit 3 having a rotor 1 and a stator 2.

In a first exemplary arrangement, which is shown in FIG. 1, clutch actuation takes place as follows. The release unit 3, which is not displaceable in the axial direction relative to the clutch axis A and serves to open and close the clutch 6, has a stator 2 which is connected to the transmission housing (not shown). The release unit 3 further has a rotor 1, which is connected to the stator 2 by axial bearings 4, and a threaded spindle 5. The threaded spindle 5 is connected at an end region thereof in a rotationally fixed manner to the clutch 6 via a pressure plate 7, in order to prevent rotation during the adjustment. The drive energy for the threaded spindle 5 is fed directly from the drive motor, or combustion engine, via the clutch 6 into the release unit 3. That is to say, the threaded spindle 5 is rotated by the drive motor, or combustion engine, and at the motor speed.

The rotor 1 is connected to the stator 2 via axial bearings 4 in such a manner that both compression forces and tensile forces can be absorbed. The rotor 1 is mounted on the threaded spindle 5, that is to say it is in engagement therewith via a spindle nut 11, which is connected to the stator 2 by axial bearings 4, and rotates with the threaded spindle 5 at the motor speed. When the rotor 1 is stopped by energization of the stator 2, for example via a cable 21 connected thereto, it displaces the threaded spindle 5 and the clutch 6 is opened. As a result of the energy supplied by the drive motor, or combustion engine, release of the clutch can thus take place by regenerative braking of the rotor 1.

The number of axial bearings 4 is dependent on the type of transmission and is chosen such that the connection between the rotor 1 and the stator 2 is stable regardless of the design of the release system, that is to say, where possible, no imbalance occurs as a result of rotation at the motor speed.

The energy obtained by braking can optionally be supplied to other devices in the motor vehicle in order to supply them with power, for example to the on-board power supply, or the energy can be used for shifting operations.

Resetting, that is to say closing of the clutch 6, advantageously takes place by the spring force of the clutch 6, in that the pitch of the threaded spindle 5 is chosen such that no self-locking occurs.

By active energization of the release unit 3, more precisely of the stator 2, an additional acceleration of the rotor 1 can also take place, in order to permit quicker closing of the clutch 6.

The rotor 1 is in the form either of a permanent magnet or of an electromagnet with a slip ring connection.

Figure 2:
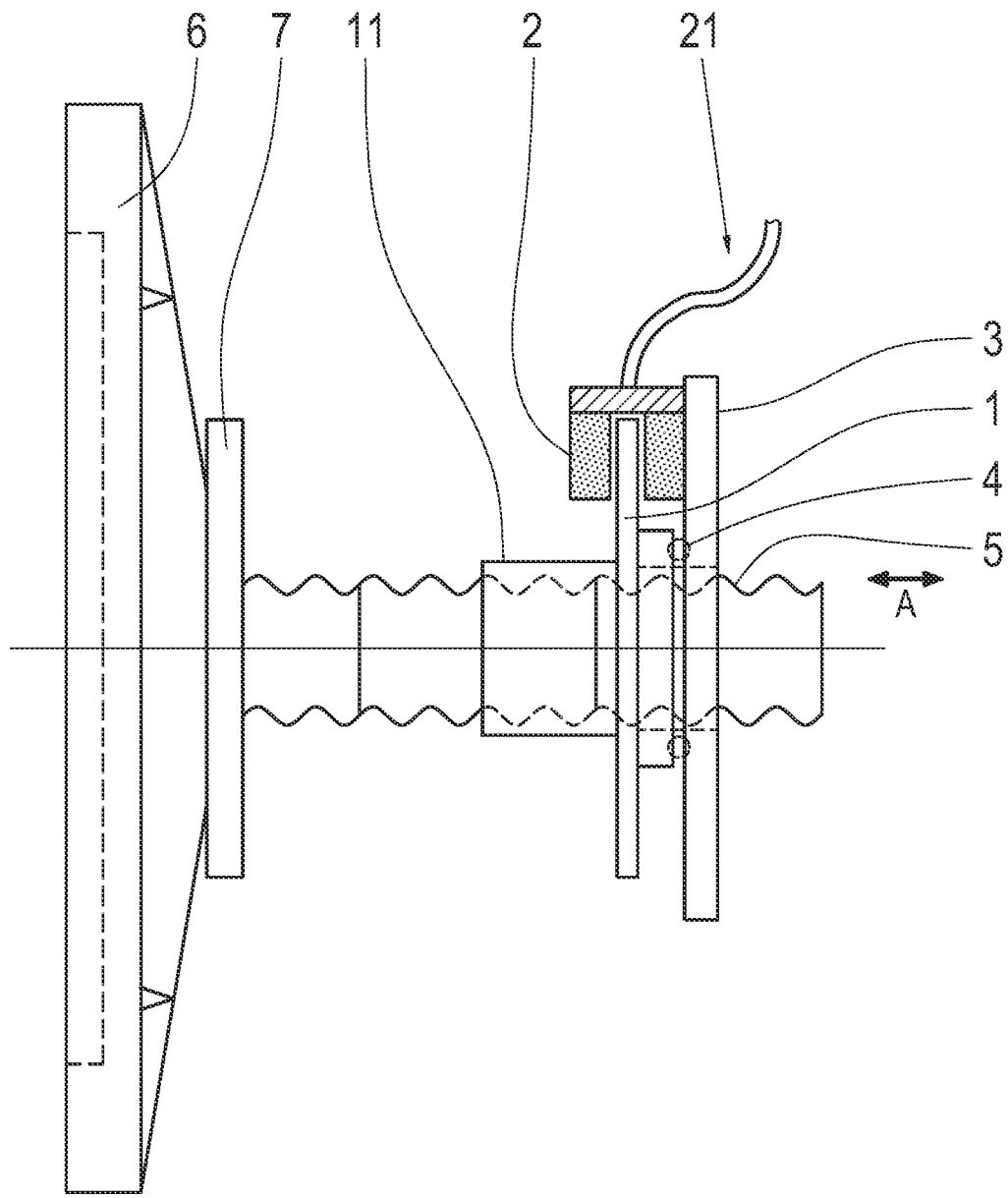
FIG. 2 shows a release system according to a further exemplary arrangement of the present disclosure.

As an alternative to regenerative actuation, the necessary braking torque can also be applied by an eddy-current brake, which is illustrated in FIG. 2. The construction here is similar to the arrangement described in FIG. 1. The release unit 3, which serves to open and close the clutch 6 via the pressure plate 7, has a stator 2 which is connected to the transmission housing (not shown). The release unit 3 further has a rotor 1, which is connected to a spindle nut 11, which is connected to the stator 2 by axial bearings 4, and a threaded spindle 5. The threaded spindle 5 is connected at an end region in a rotationally fixed manner to the clutch 6, in order to prevent rotation during the adjustment. The drive energy for the threaded spindle 5 is fed directly from the drive motor, or combustion engine, via the clutch 6 into the release unit 3. That is to say, the threaded spindle 5 is rotated by the drive motor, or combustion engine, and at the motor speed.

The rotor 1, more precisely the spindle nut 11, is connected to the stator 2 via the axial bearings 4 in such a manner that both compression forces and tensile forces can be absorbed. The rotor 1 is formed by one or more metal disks which extend around the threaded spindle 5 and rotate together with the spindle nut 11 and the threaded spindle 5. When the rotor 1 is stopped by energization of the stator 2, for example via a cable 21 attached thereto, it brakes together with the spindle nut 11, the threaded spindle 5 is displaced axially and the clutch 6 is opened.

When a plurality of metal disks are used as the rotor 1, they are arranged parallel to one another and at a distance from one another. It will be appreciated that a pole of the stator 2 is arranged on each side of each metal disk, so that a type of sandwich structure is formed. The brake force can be adapted by the number of metal disks.

Eddy-current brakes and the functioning thereof are known to the person skilled in the art. In this respect, materials and the precise design can be chosen according to the application.

The clutch 6 is thus actuated by the use of a release unit 3 having a rotor 1 and a stator 2. Accordingly, no dead volume is present compared to pneumatic actuation, so that the controllability is significantly improved. That is to say, the clutch 6 can be opened or closed more quickly in response to a control signal. Moreover, self-energization can be achieved, since the drive energy for the threaded spindle 5 is provided by the drive motor.

The clutch to be actuated is a friction clutch provided in particular in the drive train of a motor vehicle between the drive motor and the shift transmission. In one exemplary arrangement, the clutch is advantageously a starter clutch. The motor vehicle is a truck or an agricultural vehicle.

The invention claimed is:

1. A release system for actuating a clutch in the drive train of a motor vehicle between a drive motor and a shift transmission, having a threaded spindle which is connected at an end region in a rotationally fixed manner to the clutch and to the drive motor, a release unit having a stator and a rotor, which is connected to the stator by axial bearings, wherein the rotor rotates with the threaded spindle and is in engagement therewith via a spindle nut, and wherein actuation of the clutch takes place by adjustment of the rotational speed of the rotor.

2. The release system as claimed in claim 1, wherein actuation of the clutch is opening of the clutch and wherein the actuation takes place by regenerative braking of the rotor.

3. The release system as claimed in claim 2, wherein closing of the clutch takes place by additional energization of the stator.

4. The release system as claimed in claim 1, wherein actuation of the clutch is opening of the clutch and wherein the actuation takes place by an eddy-current brake, in which at least one metal disk serving as the rotor is connected to the stator by the spindle nut via the axial bearings.

5. The release system as claimed in claim 4, wherein the at least one metal disk includes at least two metal disks arranged parallel to one another at a predetermined distance from one another.

6. The release system as claimed in claim 4, wherein a pitch of the threaded spindle is chosen such that resetting of the clutch takes place automatically.

7. The release system as claimed in claim 1, wherein a pitch of the threaded spindle is chosen such that resetting of the clutch takes place automatically.

8. The release system as claimed in claim 1, wherein energy generated by actuation of the clutch is supplied to a unit present in the motor vehicle for further use.

9. A motor vehicle, having the transmission, the drive motor, and the release system as claimed in claim 1.

10. A method for controlling the release system as claimed in claim 1, wherein the threaded spindle, which is connected at the end region in a rotationally fixed manner to the clutch and thus to the drive motor, is operatively connected to the release unit, having the stator and the rotor, which is connected to the threaded spindle via the spindle nut and is connected to the stator by the axial bearings, in such a manner that actuation of the clutch takes place by adaptation of the rotational speed of the rotor.

11. The release system as claimed in claim 1, wherein the rotor is in the form of a permanent magnet.

12. A release system for actuating a clutch in the drive train of a motor vehicle between a drive motor and a shift transmission, having a threaded spindle which is connected at an end region in a rotationally fixed manner to the clutch and to the drive motor, a release unit having a stator and a rotor, which is connected to the stator by axial bearings, wherein the rotor rotates with the threaded spindle and is in engagement therewith via a spindle nut, wherein the rotor is in the form of an electromagnet with a slip ring connection; and wherein actuation of the clutch takes place by adjustment of the rotational speed of the rotor by regenerative braking of the rotor.

13. The release system as claimed in claim 12, wherein a pitch of the threaded spindle is chosen such that resetting of the clutch takes place automatically.

14. The release system as claimed in claim 12, wherein energy generated by actuation of the clutch is supplied to a unit present in the motor vehicle for further use.

* * * * *